(12) United States Patent
Choi et al.

(10) Patent No.: US 7,580,100 B2
(45) Date of Patent: Aug. 25, 2009

(54) ALIGNING METHOD OF FERROELECTRIC LIQUID CRYSTAL DISPLAY AND FERROELECTRIC LIQUID CRYSTAL DISPLAY APPARATUS USING THE SAME

(75) Inventors: Suk Won Choi, Kyounggi-do (KR); Hong Chul Kim, Kyounggi-do (KR)

(73) Assignee: LG Display Co., Ltd., Seoul (KR)

( * ) Notice: Subject to any disclaimer, the term of this patent is extended or adjusted under 35 U.S.C. 154(b) by 511 days.

(21) Appl. No.: 10/733,305

(22) Filed: Dec. 12, 2003

(65) Prior Publication Data

US 2008/0170023 A1    Jul. 17, 2008

(30) Foreign Application Priority Data

Dec. 14, 2002    (KR) .................. 10-2002-0079984

(51) Int. Cl.
*G02F 1/1337*    (2006.01)

(52) U.S. Cl. .................. 349/126; 349/123; 349/128

(58) Field of Classification Search .................. 349/133, 349/167, 171, 172, 124, 126, 128, 123
See application file for complete search history.

(56) References Cited

U.S. PATENT DOCUMENTS

| | | | |
|---|---|---|---|
| 5,504,600 A | | 4/1996 | Pirs et al. |
| 5,917,569 A | * | 6/1999 | Tanuma et al. .............. 349/123 |
| 6,015,507 A | | 1/2000 | Kobayashi et al. |
| 6,108,061 A | | 8/2000 | Sako et al. |
| 6,133,974 A | * | 10/2000 | Ishii .......................... 349/129 |
| 6,445,434 B2 | * | 9/2002 | Takato et al. ................ 349/123 |

* cited by examiner

*Primary Examiner*—David Nelms
*Assistant Examiner*—Nathanael R Briggs
(74) *Attorney, Agent, or Firm*—Morgan Lewis & Bockius LLP

(57) ABSTRACT

An aligning method of a ferroelectric liquid crystal display includes; disposing a first mask and a second mask, each of which has opening regions and blocking regions arranged in alternating fashion in vertical direction and horizontal direction corresponding to liquid crystal cells of the liquid crystal display; and injecting a ferroelectric liquid crystal material within the liquid crystal panel.

10 Claims, 21 Drawing Sheets

FIG.7A
RELATED ART

ODD-NUMBERED FRAME

| + | − | + | − | + | − | + | − |
|---|---|---|---|---|---|---|---|
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |

FIG.7B
RELATED ART

EVEN-NUMBERED FRAME

| − | + | − | + | − | + | − | + |
|---|---|---|---|---|---|---|---|
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |

FIG.8A
RELATED ART
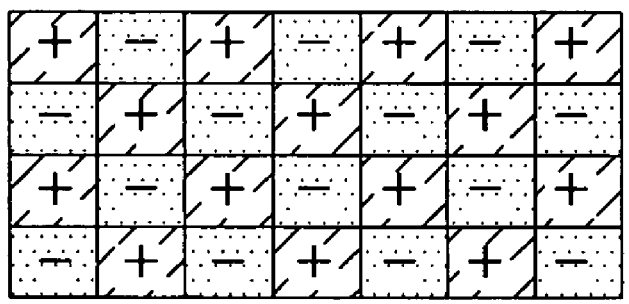
ODD-NUMBERED FRAME
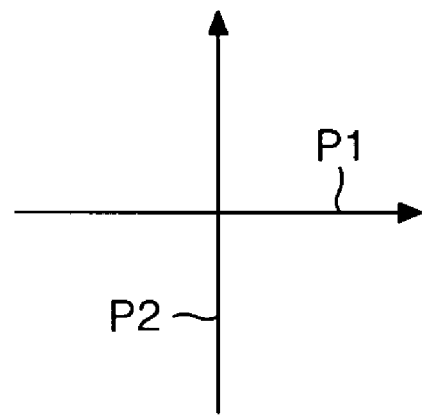

FIG.8B
RELATED ART
EVEN-NUMBERED FRAME
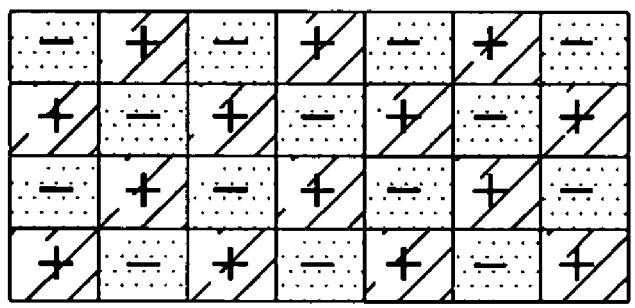
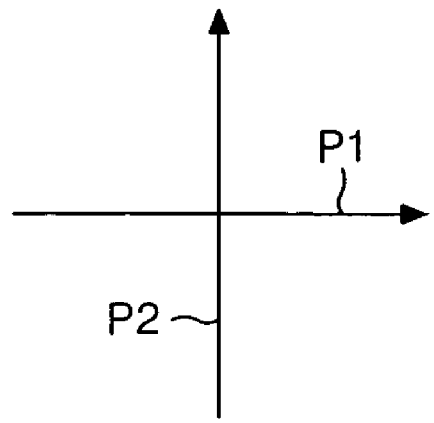
 : LIGHT TRANSMISSION
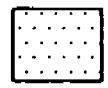 : LIGHT CUT-OFF

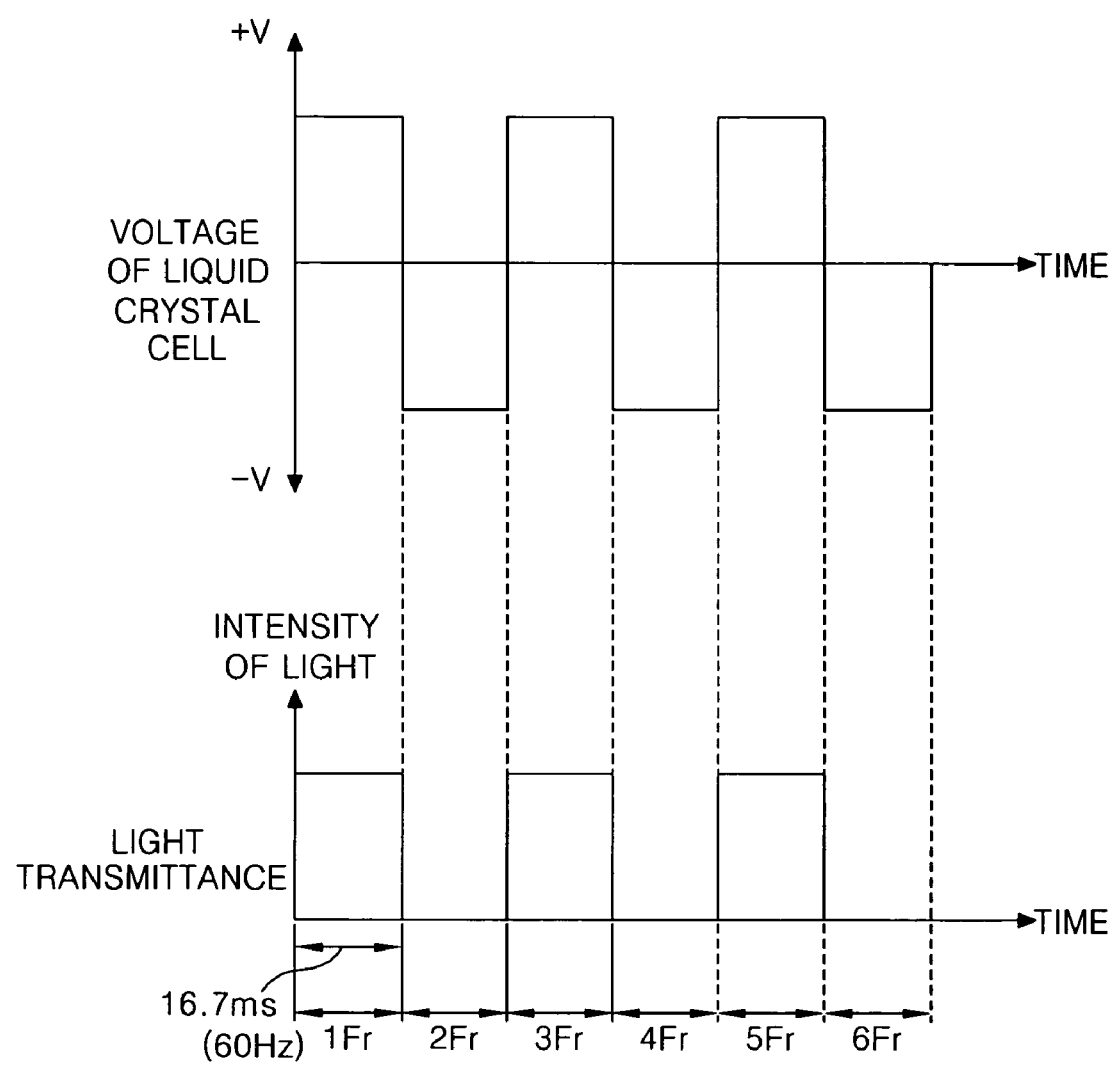

FIG.11
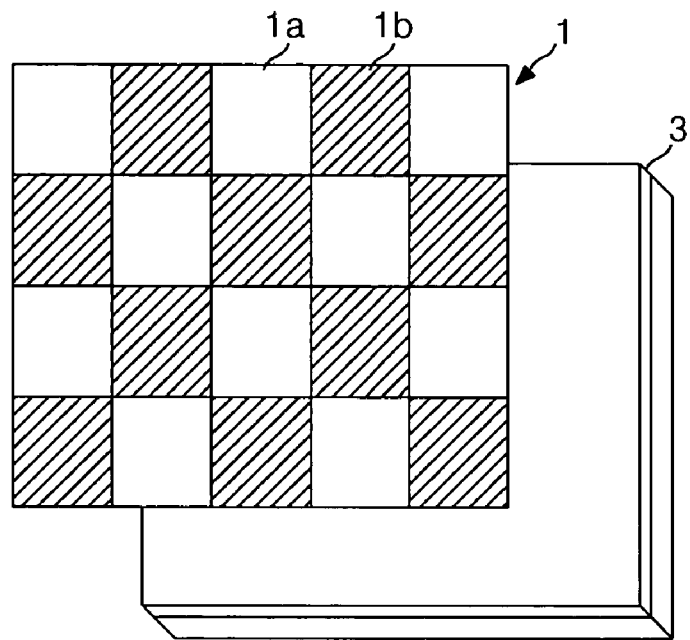
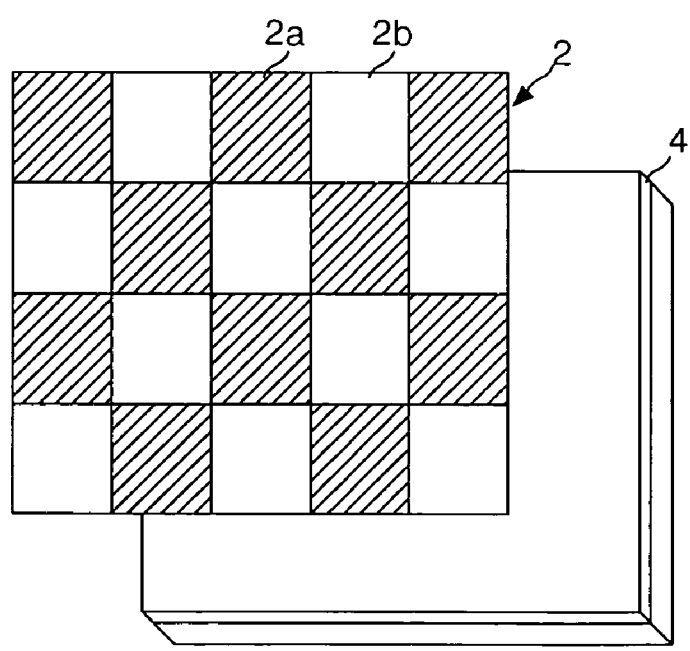

ALIGNING METHOD OF FERROELECTRIC LIQUID CRYSTAL DISPLAY AND FERROELECTRIC LIQUID CRYSTAL DISPLAY APPARATUS USING THE SAME

The present invention claims the benefit of Korean Patent Application No. P2002-79984 filed in Korea on Dec. 14, 2002, which is hereby incorporated by reference.

BACKGROUND OF THE INVENTION

1. Field of the Invention

The present invention relates to a ferroelectric liquid crystal display, and more particularly to an aligning method of ferroelectric liquid crystal display.

2. Description of the Related Art

Generally, liquid crystal displays (LCDs) display pictures by applying electric fields to a layer of liquid crystal material in response to an applied video signal, wherein the applied electric field controls the orientation of the liquid crystal molecules within the layer of liquid crystal material. The liquid crystal material within LCDs exhibits an intermediate material phase between solid and liquid phases wherein liquid crystal molecules exhibit both fluidity and elasticity.

Currently, the most common type of liquid crystal material used in LCDs include twisted nematic mode (TN mode) liquid crystal material. Although the response speed of the TN mode LCDs can vary in accordance with physical properties of the liquid crystal material, cell gap, etc., the response time for TN mode LCDs is generally greater than one picture frame of about 16.67 ms (according to the National Television System Committee NTSC). Accordingly, moving images displayed by TN mode LCDs often appear blurred and can include undesirable contour trails. To overcome the aforementioned problems, TN mode liquid crystal material can be replaced by ferroelectric liquid crystal (FLC) material having a response speed generally greater than that of TN mode liquid crystal material. Therefore, LCDs injected with FLC material can display high quality moving pictures.

FLC material exhibits a lamellar structure, wherein each layer of FLC material has the same electric and magnetic properties. Accordingly, when FLC material is driven, molecules of FLC material within the same layer spontaneously rotate (i.e., polarize) along a virtual cone in response to an applied electric field. In the absence of an applied electric field, molecules within the FLC material spontaneously polarize to an original alignment orientation. Accordingly, when external electric fields are applied to the FLC material, molecules within the FLC material rotate rapidly by interaction of an external field and exhibit spontaneous polarization. The response speed of FLC material is typically between a hundred or a thousand times faster than other modes of liquid crystal material. Further, FLC material has an inherent in-plane-switching property and can therefore be used to provide LCDs with wide viewing angles without special electrode structures or compensation films. Depending on its behavior in the presence of applied electric fields, FLC material may be classified as V-Switching or Half V-Switching Modes.

V-Switching Mode FLC material exhibits the following thermodynamic phase transformations upon decreasing temperature: isotropic→smectic A phase (SA)→smectic X phase (Sm X*)→crystalline. In the isotropic phase, molecules within the FLC material are oriented and distributed substantially isotropically (e.g., randomly). In the smectic A phase (SA) phase, molecules within the FLC material are divided into symmetrically arranged layers of vertically arranged molecules. In the smectic X phase (Sm X*) phase, molecules within the FLC material are arranged according to an intermediate order between smectic A and crystalline phases.

FIG. 1 illustrates a graph for the transmissivity of incident light versus voltage applied to a V-Switching Mode ferroelectric liquid crystal cell. As shown in FIG. 1, the transmissivity of light incident to a V-Switching Mode FLC cell exhibiting the smectic X phase (Sm X*) is dependent upon the polarity of an applied driving data voltage (e.g., +V and −V). Accordingly, the arrangement of liquid crystal molecules within V-Switching Mode FLC material may be affected by the applied external voltage. V-Switching Mode FLC material beneficially has high response speed and wide viewing angle characteristics but disadvantageously requires a large amount of power in order to be driven because a capacitance value of the V-Switching Mode FLC material is relatively large. Therefore, a capacitance value of a storage capacitor used to maintain applied data voltages is also large. Accordingly, if V-Switching Mode FLC material is used LCDs, an aperture ratio of the LCD becomes low since the power consumption of LCD and an electrode area of a sub-capacitor increases. Half V-Switching Mode FLC material beneficially has a high response speed and wide viewing angle characteristics and a relatively low capacitance value. Therefore, Half V-Switching Mode FLC material is often used to display moving pictures.

FIG. 2 illustrates phase transformations of Half V-Switching Mode ferroelectric liquid crystal material. As shown in FIG. 2, when the temperature decreases below the phase transformation temperature (Tni), Half V-Switching Mode FLC material exhibits a phase transformation from the isotropic to the nematic phase (N*), below phase transformation temperature (Tsn), the Half V-Switching Mode FLC material exhibits a phase transformation from the nematic phase (N*) to the smectic C phase (Sm C*), and below phase transformation temperature (Tcs) the Half V-Switching Mode FLC material exhibits a phase transformation from the smectic C phase to the crystalline phase. Therefore, as the temperature decreases, Half V-Switching Mode FLC material exhibits the following thermodynamic phase transformations: isotropic→nematic (N*)→smectic C phase (Sm C*)→crystalline.

FIG. 3 and FIG. 4 illustrate the fabrication of a liquid crystal cell including Half V-Switching Mode FLC material. Referring to FIG. 3 and FIG. 4, Half V-Switching Mode FLC material is typically injected into a liquid crystal cell at a temperature above Tni. Accordingly, when the Half V-Switching Mode FLC material is injected into the liquid crystal cell, molecules within the FLC material are oriented and distributed substantially isotropically (e.g., randomly). When the temperature of the FLC material goes below Tni, molecules within the FLC material become aligned substantially parallel to each other along a direction dictated by the rubbing direction of an orientation layer and the FLC material exhibits the nematic phase (N*). If the temperature of the FLC material is further lowered the temperature below Tsn in the presence of an electric field, the FLC material exhibits the smectic phase (C*) and the liquid crystal molecules spontaneously polarize along the direction of the applied electric field to exhibit a monostable state, wherein liquid crystal molecules uniformly assume one of two possible molecular arrangements. If, on the other hand, the temperature of the FLC material is lowered below Tsn in the absence of an applied electric field, the liquid crystal molecules become separated into layers to exhibit a bistable state, wherein liquid crystal molecules within each layer uniformly assume one of the two possible molecular arrangements. Further, the distribution of the molecular arrangements within the layers is substantially random. In view of the above, it is generally more difficult to uniformly control of the FLC material exhibiting the bistable state than to uniformly control of the FLC material exhibiting the monostable state. Accordingly, the Half V-Mode FLC cells are generally fabricated to exhibit the monostable state by cooling the FLC material below Tsn in the presence of an electric filed generated by applying a small direct current (DC) voltage to the LCD panel.

Referring still to FIG. 3, the symbol "ⓧ" describes the direction of the applied electric field as extending out of the plane of the illustration. Therefore the spontaneous polarization direction of the FLC material also extends out of the plane of the illustration. Accordingly, electrodes used to generate the applied electric field are formed on upper and lower plates of the liquid crystal cell, extending out of the plane of the illustration. Further, the orientation layer described above is formed on the upper and lower plates.

FIGS. 5A and 5B illustrate the dependence of light transmissivity on a voltage applied to a Half V-Switching Mode FLC cell. Referring to FIG. 5A, Half V-Switching Mode FLC cells containing FLC material aligned in the presence of an applied electric field generated by a voltage having a negative polarity (−V) (i.e., fabricated in the presence of an electric field having a negative polarity), transmit light in the presence of an applied voltage having a positive polarity (+V) by rotating a polarization axis of the light by 90°. The light transmissivity of the Half V-Switching Mode FLC cell increases proportionally to the intensity of an applied positive electric field generated by the positive voltage (+V). Further, the light transmissivity of the Half V-Switching Mode FLC cell attains a maximum value when the intensity of the applied positive electric field is greater than a fixed threshold value of the FLC material. In the presence of an applied voltage having a negative voltage (−V), the Half V-Switching Mode FLC cell does not rotate the polarization axis of the light. Accordingly, in the presence of an applied voltage having a negative polarity, the Half V-Switching Mode FLC cell transmits substantially no light (i.e., the Half V-Switching Mode FLC cell intercepts the light).

Referring to FIG. 5B, Half V-Switching Mode FLC cells containing FLC material aligned in the presence of an applied electric field generated by a voltage having a positive polarity (+V) (i.e., fabricated in the presence of an electric field having a positive polarity), transmit light in the presence of an applied voltage having a negative polarity (−V). Further, in the presence of an applied voltage having a positive polarity (+V), the Half V-Switching Mode FLC cell does not rotate the polarization axis of the light. Accordingly, in the presence of an applied voltage having a positive polarity, the Half V-Switching Mode FLC cell intercepts the light.

FIGS. 6A and 6B illustrate the orientation directions of Half V-Switching Mode FLC material in the presence of applied electric fields used to fabricate the liquid crystal cell and applied electric fields used to drive the liquid crystal cell, respectively. Referring to FIG. 6A, when the Half V-Switching Mode FLC cell is fabricated in the presence of an externally applied electric field generated by a voltage having a negative polarity, the spontaneous polarization direction (Ps) of FLC material becomes uniformly aligned to the direction of the externally applied electric field having the negative polarity (E(−)). As shown in FIG. 6B, if, during a subsequent driving of the LCD panel, an electric field having a positive polarity (e.g., an electric field generated by applying a voltage having a positive polarity to the LCD panel) (E(+)) is applied to the fabricated Half V-Switching Mode FLC cell, the FLC material spontaneously polarizes along a spontaneous polarization direction (Ps) uniformly aligned with the direction of the applied electric field having the positive polarity. Accordingly, a polarization state of light incident to a lower plate of the LCD panel may be rotated to substantially align with the polarization direction of an upper polarizer on an upper plate via the FLC material, having the spontaneous polarization direction (Ps) uniformly aligned with the externally applied electric field having the positive polarity, and the incident light is transmitted through the upper plate. If, however, during driving of the LCD panel, the applied external electric field is generated by an applied voltage having a negative polarity (and thus itself has a negative polarity (E(−)), or if, during driving, no electric field is applied, the FLC material remains uniformly aligned along its initial spontaneous polarization direction (Ps) (characterized by the applied electric field having the negative polarity) and the incident light beam is not transmitted through the upper plate (i.e., the light is intercepted by the liquid crystal cell).

If, during fabrication, the entire LCD panel is uniformly aligned under an applied electric field having a single polarity (e.g., a positive polarity (+) or a negative polarity (−)), defects may be generated within the fabricated Half V-Switching Mode FLC cell when the LCD panel is driven according to an inversion driving method. Such defects may be manifested by the lowering of a brightness of displayed pictures and flickering (e.g., blinking) of the displayed pictures. Such flickering may be reduced by employing inversion driving methods to drive LCD panels, wherein the inversion driving methods also prevent a degradation of liquid crystal material within the LCD panel by inverting the polarity of applied data voltages between predetermined periods of the LCD panel. For example, a frame inversion driving method inverts the polarity of data voltages applied between successive frame periods at a frequency of 60 Hz, in correspondence with the frame period of 16.7 ms. A line inversion driving method inverts the polarity of data voltages between successive frame periods and horizontal lines. A column inversion driving method inverts the polarity of data voltages between successive frame periods and vertical lines. Lastly, a dot inversion driving method inverts the polarity of data voltages between successive frame periods, horizontal lines, and vertical lines, as shown in FIGS. 7A and 7B. Because the polarity of data voltages can be inverted between successive frame periods, horizontal lines, and vertical lines, the dot inversion driving method is most commonly used within LCDs to minimize flickering.

LCDs including a plurality of Half V-Switching Mode FLC cells, fabricated in the presence of a uniformly applied electric field having a negative polarity and arranged in a matrix pattern, may be driven according to the dot inversion driving method. Accordingly, and with reference to FIGS. 8A and 8B, horizontally and vertically adjacent ones of Half V-Switching Mode FLC cells arranged within an LCD panel may alternately transmit and intercept light because each Half V-Switching Mode FLC cells can only transmit light in the presence of an applied electric field having a positive polarity. For example, odd ones of the FLC cells arranged within odd horizontal lines of liquid crystal cells and even ones of the FLC cells arranged within even horizontal lines of liquid crystal cells transmit light in response to an electric field having a positive polarity (+) applied during odd frames (see FIG. 8A) and intercept light in response to an electric field having a negative polarity (−) applied during even frames (see FIG. 8B). Moreover, even ones of the FLC cells arranged within odd horizontal lines of liquid crystal cells and odd ones of the FLC cells arranged within even horizontal lines of liquid crystal cells transmit light in response to an electric field having a positive polarity (+) applied during even frames (see FIG. 8B) and intercept light in response to an electric field having a negative polarity (−) applied during odd frames (see FIG. 8A).

Referring still to FIGS. 8A and 8B, reference numerals 'P1' and 'P2' indicate the polarization axes of polarization plates arranged on upper and lower substrates of the LCD panel, respectively. The polarization axis of each polarization plate determines polarization characteristics of light it will transmit. As shown in FIGS. 8A and 8B, the polarization axes of the upper and lower polarization plates are substantially perpendicular to each other. Within liquid crystal cells transmitting light, light having a polarization direction parallel to P1 (or P2) is transmitted by an incident polarization plate, through the FLC material, and is subsequently transmitted by a display polarization plate where the light transmitted by the display polarization plate has a polarization direction parallel to P2 (or P1). Within the liquid crystal cells intercepting light, light having a polarization direction parallel to P1 (or P2) is transmitted by an incident polarization plate is not transmitted to the display polarization plate having the polarization axis of P2 (or P1).

FIG. 9 illustrates a graph of a data voltage charged to a Half V-Switching Mode FLC cell within an LCD panel and the corresponding light transmissivity characteristics of the liquid crystal cell. As shown in FIG. 9, a driving data voltage having a frequency of 60 Hz is uniformly applied to aforementioned FLC cells (e.g., FLC cells fabricated in the presence of an applied electric field having a negative polarity) arranged within the LCD panel. Accordingly, the polarity of the applied driving data voltage is inverted each successive frame period of the LCD panel (i.e., 16.7 ms). As a result, the FLC cells transmit light during odd frame periods 1Fr, 3Fr, 5Fr, etc., when the applied driving data voltage generates an electric field having a positive polarity (e.g., when the applied driving data voltage has a positive polarity, +V), and transmits substantially no light (i.e., intercepts light) when the applied driving data voltage generates an electric field having a negative polarity (e.g., when the applied driving data voltage has a negative polarity, −V). Therefore, when LCD panels including uniformly fabricated Half V-Switching Mode FLC cells are driven, the overall brightness of the LCD panel decreases and pictures displayed by the LCD panel appear to flicker because viewers perceive the transmitted light periodically within each frame period of the LCD panel.

Blurring or contour trailing occurs when the LCD panel displays moving pictures due to a slow response time of the FLC material and due to predetermined maintenance characteristics of the FLC material. Cathode ray tubes (CRTs) do not display pictures by maintaining data voltages. Rather, CRTs are a type of impulse display system capable of displaying pictures instantaneously. Accordingly, the aforementioned blurring or contour trailing does not occur when moving pictures are displayed by CRTs. Referring to FIG. 9, CRTs display pictures by irradiating electrons onto a portion of a fluorescent screen for short amount of time within each frame period. Accordingly, each portion of the fluorescent screen remains dark for a portion of each frame period. In contrast, and with reference to FIG. 9, LCDs display pictures by charging data voltages to liquid crystal cells during a scanning period when gate high voltages (Vgh) are applied, wherein, once they are charged, the data voltages are maintained within the liquid crystal cells until they are refreshed in a successive frame period.

If all of the ferroelectric liquid crystal cells in the ferroelectric liquid crystal display of the related art uniformly are aligned under electric field with electric field of same polarity upon aligning under electric field, since observers see the light only in long axis direction or short axis direction of the liquid crystal molecule upon rotating of liquid crystal molecule, the viewing angle does not reach a satisfactory level. A problem arise in that color-inversion phenomenon depending upon the location of observers with respect to the liquid crystal display.

SUMMARY OF THE INVENTION

Accordingly, the present invention is directed to an aligning method of a ferroelectric liquid crystal display and a ferroelectric liquid crystal display apparatus that substantially obviates one or more of the problems due to limitations and disadvantages of the related art.

An object of the present invention to provide an aligning method of a ferroelectric liquid crystal display that does require an electric field alignment.

Another object of the present invention to provide the ferroelectric liquid crystal display capable of improving color characteristic and adaptive for implementing moving pictures.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other objects of the invention, there is provided an aligning method of ferroelectric liquid crystal display including; disposing a first mask and a second mask, each of which has opening regions and blocking regions arranged in alternating fashion in vertical direction and horizontal direction corresponding to liquid crystal cells of the liquid crystal display; and injecting a ferroelectric liquid crystal material within the liquid crystal panel.

In another aspect, An aligning method of a ferroelectric liquid crystal display includes the steps of: aligning an upper plate of a liquid crystal panel by using a first mask having a first plurality of opening regions patterned thereon; aligning a lower plate of the liquid crystal panel by using a second mask having a second plurality of opening regions patterned thereon; assembling the upper plate and the lower plate of the liquid crystal panel; and injecting a ferroelectric liquid crystal material between the assembled the upper and the lower plate of the liquid crystal panel.

In yet another aspect, a ferroelectric liquid crystal display includes: a liquid crystal panel having first regions and second regions having rubbing directions that are respectively aligned in different directions, wherein the first regions and the second regions are alternately arranged in a vertical direction and horizontal direction of the liquid crystal panel; a ferroelectric liquid crystal injected into the liquid crystal panel; and a multiplied-speed driving circuit for driving the liquid crystal panel having the ferroelectric liquid crystal in accordance with a frequency multiplying predetermined reference frequency.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Figure 7A:
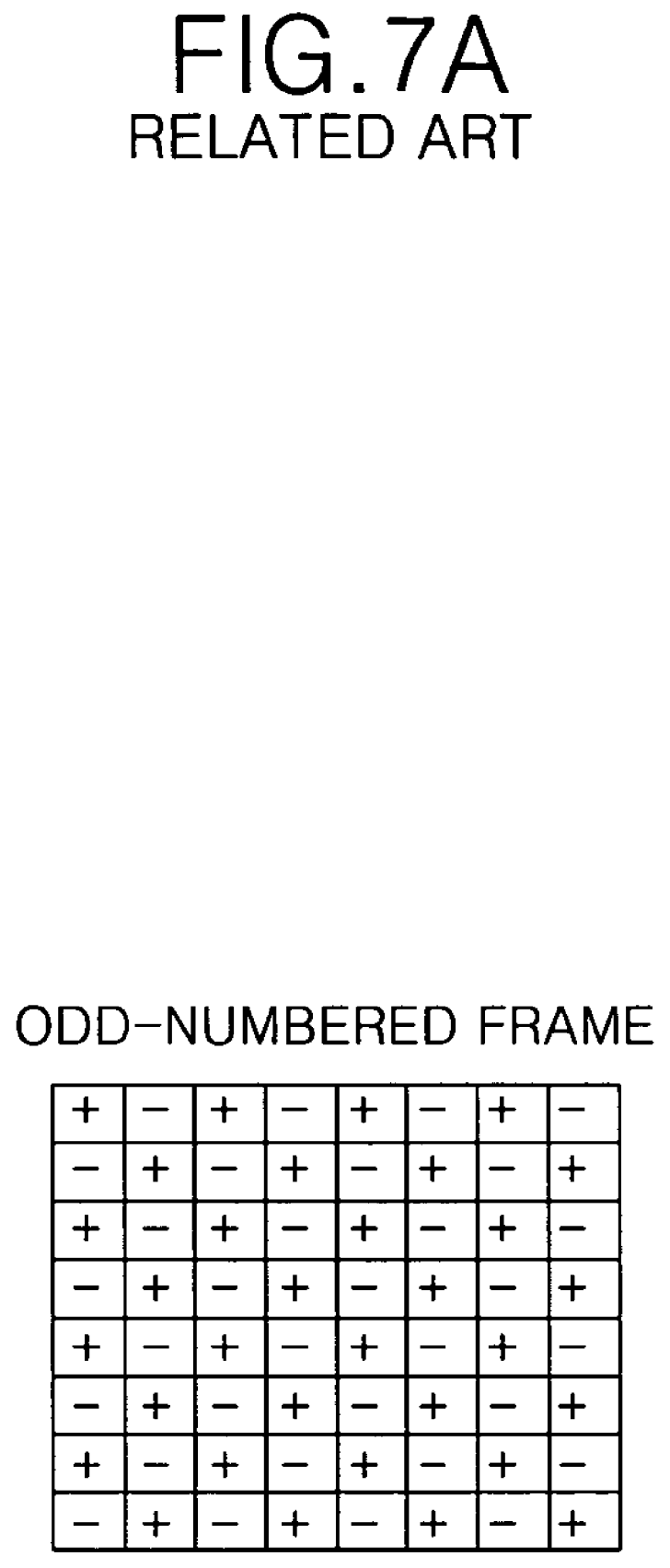
Figure 7B:
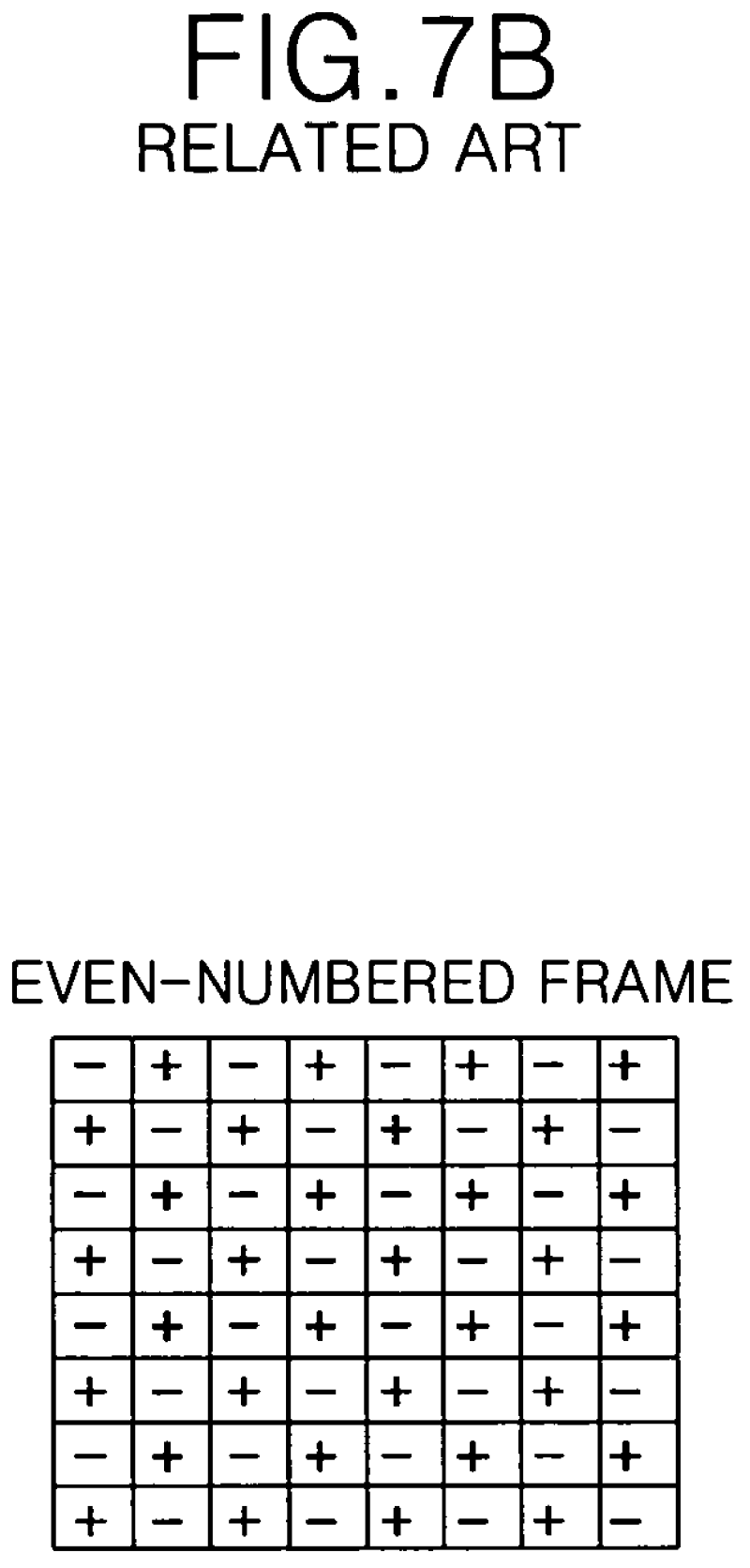

FIGS. 7A and 7B illustrate dot inversion method.

FIGS. 8A and 8B illustrate transmission and cutting-off in case that ferroelectric liquid crystal of Half V-Switching mode is uniformly aligned on whole panel and is driven by dot inversion method.

FIG. 9 is a graph illustrating voltage charged to liquid crystal cell having ferroelectric liquid crystal material of Half V-Switching mode injected therein upon driving at a reference frequency and light transmissivity corresponding to the voltage.

FIG. 11 schematically illustrates masks employed in alignment process of ferroelectric liquid crystal display according to an embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
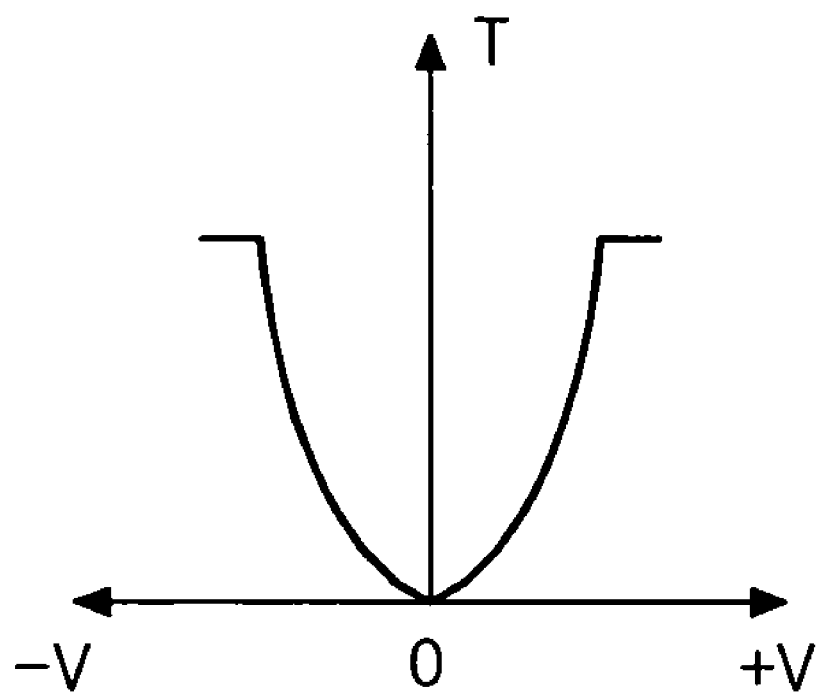
FIG. 1 is a graph illustrating voltage of ferroelectric liquid crystal of V-Switching mode vs. transmissivity characteristic.
Figure 2:
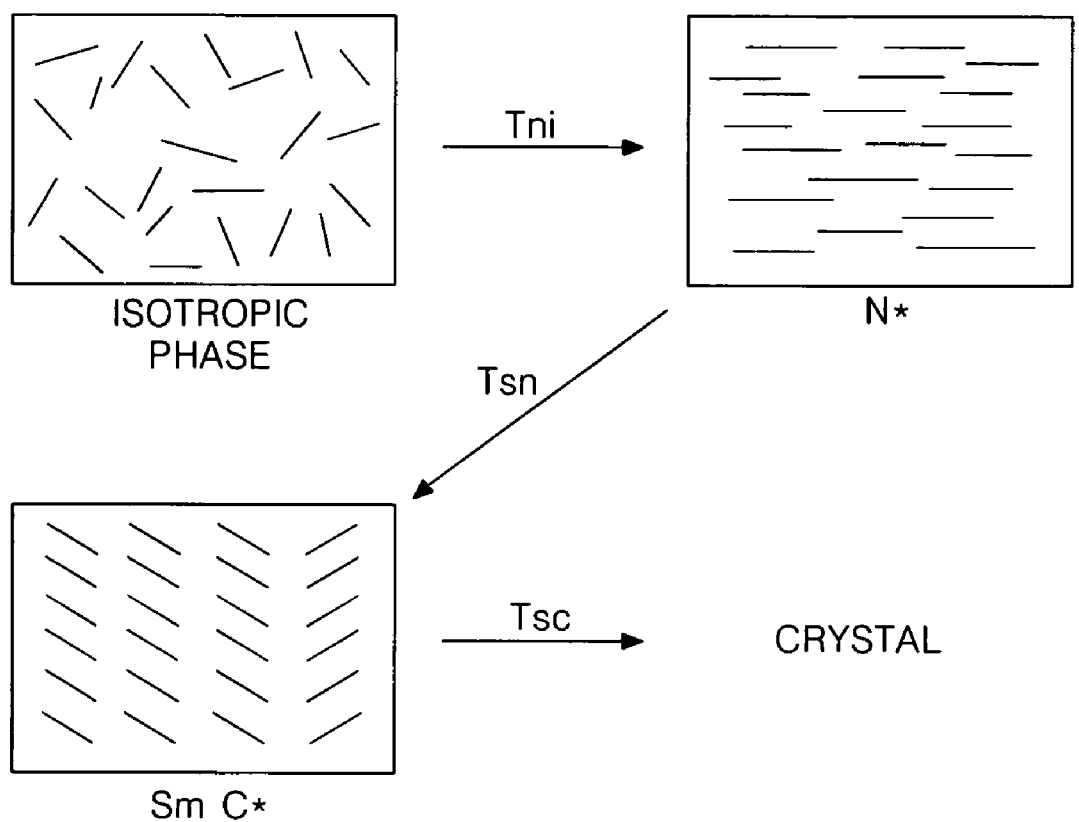
FIG. 2 illustrates a phase transition process of ferroelectric liquid crystal of Half V-Switching mode.
Figure 3:
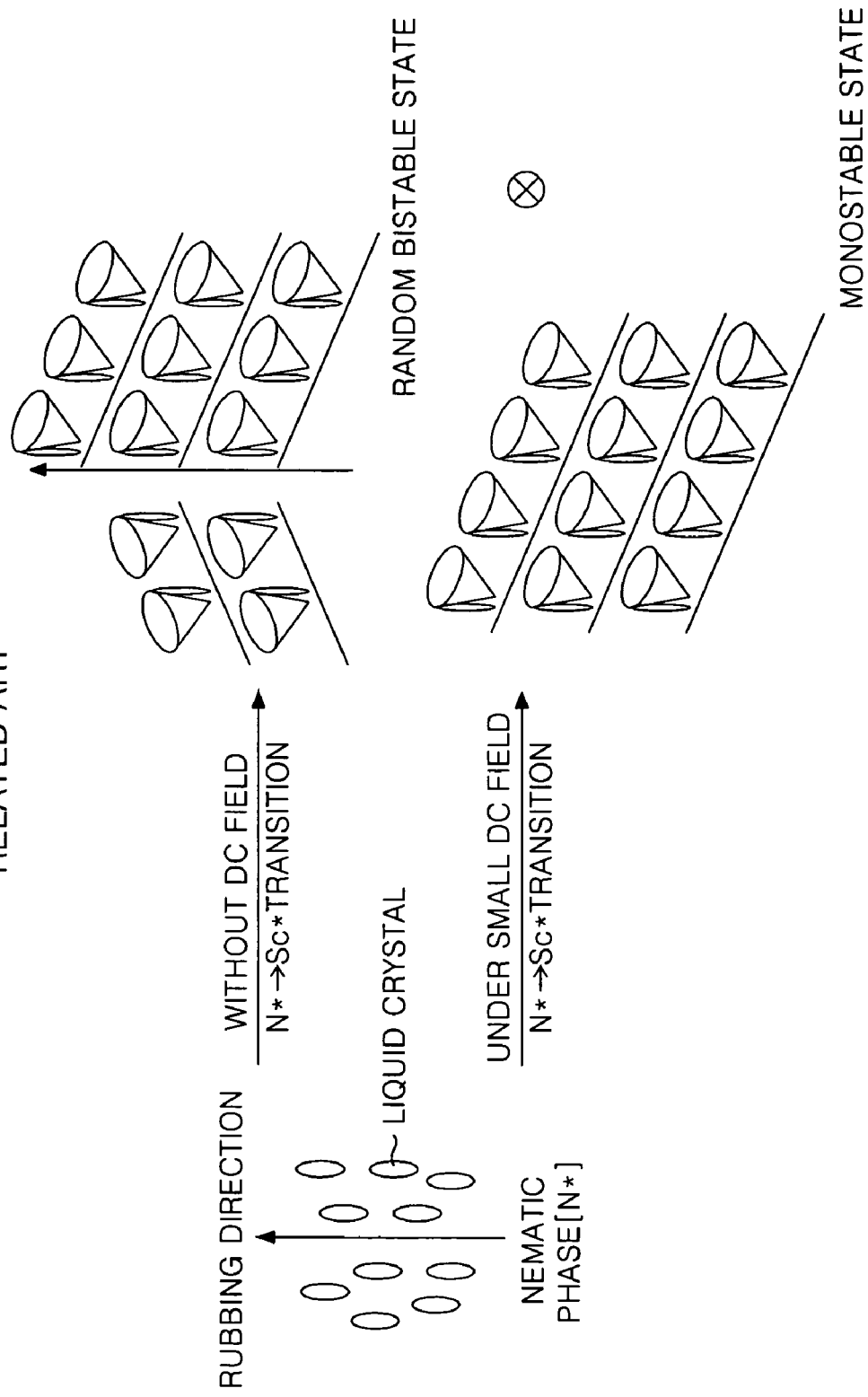
FIG. 3 illustrates changes of molecule arrangement according to whether electric field alignment in ferroelectric liquid crystal of Half V-Switching mode.
Figure 4:
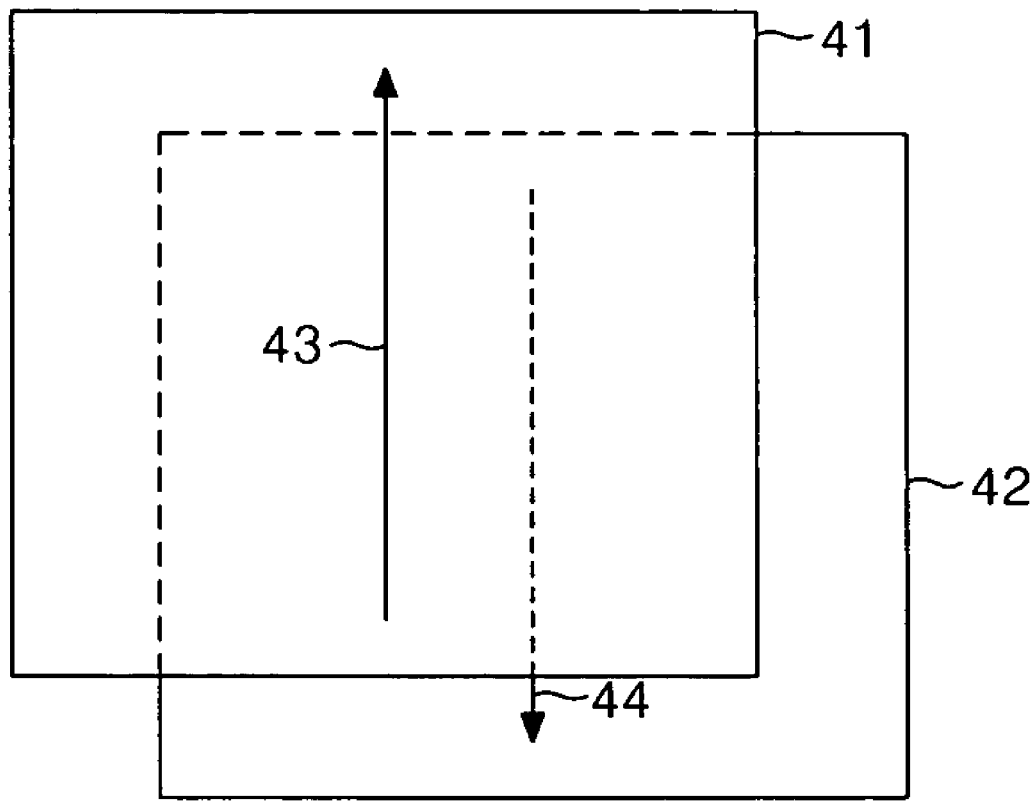
FIG. 4 illustrates uniform rubbing of ferroelectric liquid crystal display of Half V-Switching mode of the related art.
Figure 5A:
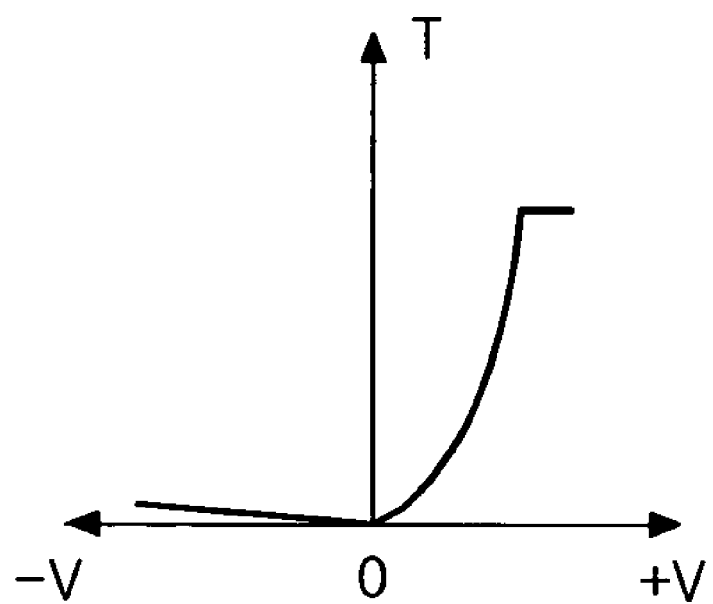
FIGS. 5A and 5B are graphs illustrating voltage of Half V-Switching mode vs. transmissivity characteristic.
Figure 5B:
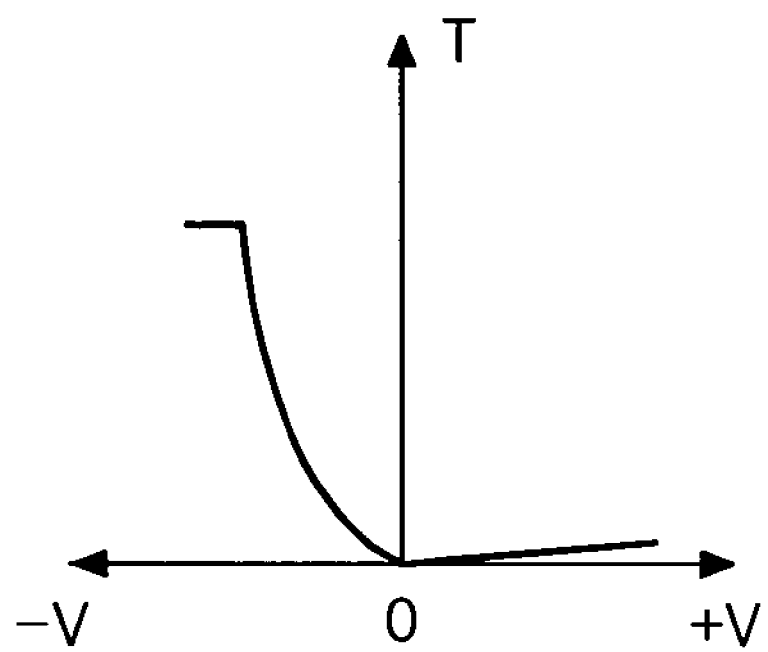
Figure 6A:
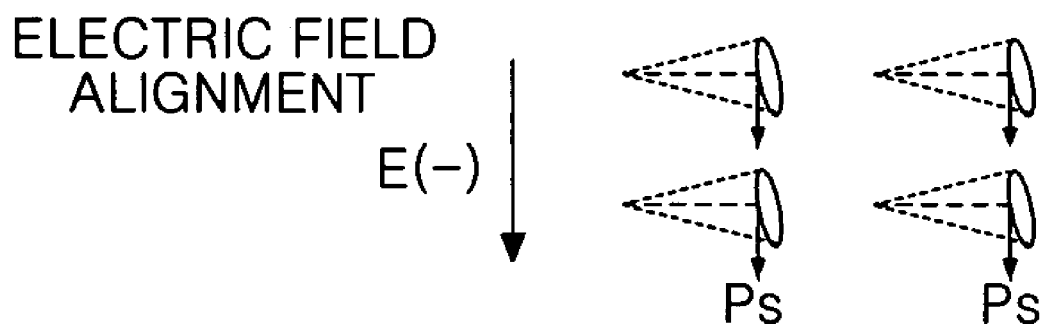
FIGS. 6A and 6B illustrates ferroelectric liquid crystal of Half V-Switching mode upon aligning under electric field.
Figure 6B:
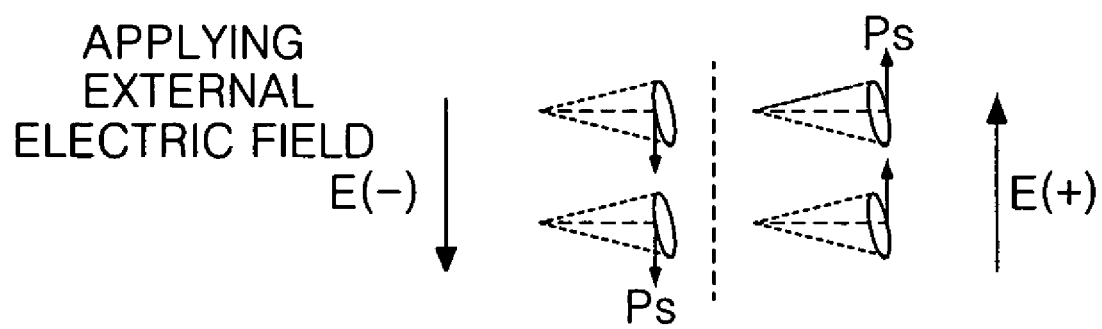
Figure 10:
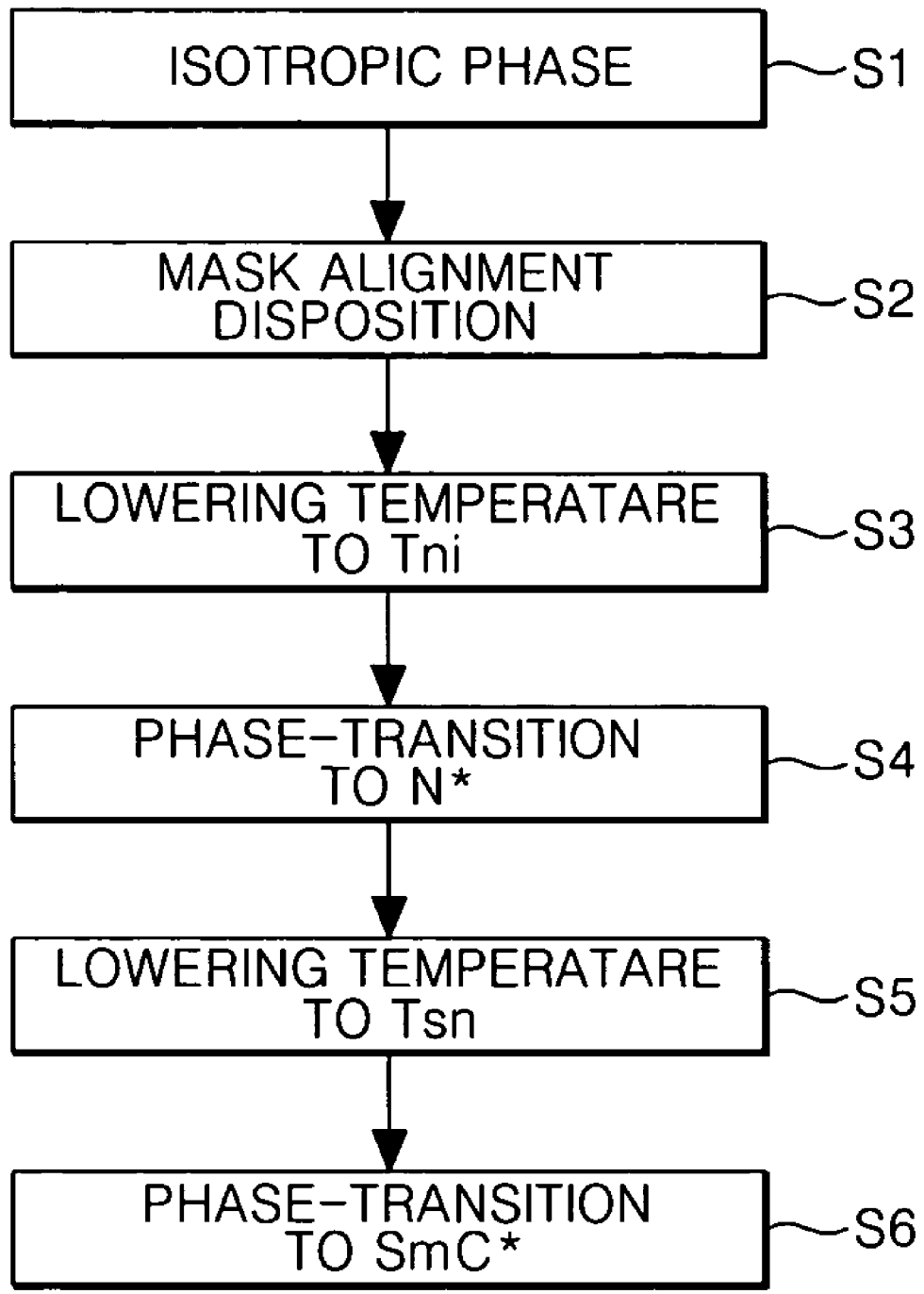
FIG. 10 is a flow chart sequentially illustrating manufacturing process of ferroelectric liquid crystal display according to an embodiment of the present invention.

FIG. 10 is a flow chart sequentially illustrating manufacturing process of ferroelectric liquid crystal display according to an embodiment of the present invention. FIG. 11 schematically illustrates masks employed in alignment process of ferroelectric liquid crystal display according to an embodiment of the present invention. As shown in FIG. 10, an alignment method of a ferroelectric liquid crystal display according to the embodiment of the present invention comprises injecting a ferroelectric liquid crystal material in a liquid crystal cell of a liquid crystal panel, which is aligned through a rubbing process using a mask such that liquid crystal molecules are arranged in a isotropic phase (S1 and S2) at an incipient temperature of approximately 100 degrees Celsius.

As shown in FIG. 11, the masks are categorized into an upper mask 1 and a lower mask 2, each of which has opening regions (or windows) 1a and 2a, and blocking regions 1b and 2b arranged in alternating fashion in vertical direction and horizontal direction for each liquid crystal cell. The opening regions 1a of the upper mask 1 and the opening regions 2a of lower mask 2 are cross patterned with respect to each other. That is, the opening regions 1a and 2a and the blocking regions 1b and 2b of the upper mask 1 and the lower mask 2 are mutually inverted with respect to each other. Accordingly, each of the opening regions 1a of the upper mask 1 corresponds to a liquid crystal cell shielded by one of the blocking regions 2b of the lower mask 2, and each of the opening regions 2a of the lower mask 2 corresponds to a liquid crystal cell shielded by one of the blocking regions 1b of the lower mask 1. An alignment film 3 of an upper plate and an alignment film 4 of a lower plate are independently rubbed or are independently aligned by ultraviolet ray exposure using masks 1 and 2. An alignment by rubbing aligns the alignment films 3 and 4 by using rubbing texture to set a pre-tilt angle of the ferroelectric liquid crystal corresponding to the opening regions 1a and 2a of the masks 1 and 2. An alignment by ultraviolet ray exposure radiates ultraviolet rays onto the alignment films 3 and 4 through the opening regions 1a and 2a of the masks 1 and 2 to thereby change molecule arrangement on a part of the alignment films 3 and 4 to thereby set the pre-tilt angle of the ferroelectric liquid crystal.

At the incipient temperature, if temperature is lowered below transition temperature Tni in which the ferroelectric liquid crystal is phase-transited from isotropic phase to nematic phase, the arrangement of the ferroelectric liquid crystal becomes a nematic phase (N*) (S3, S4 of FIG. 10). The transition temperature Tni is approximately 90° C.~100° C. Subsequently, if the temperature is further lowered below the transition temperature Tsn in which the ferroelectric liquid crystal is phase-transited from nematic phase to smectic C phase (Sm C*), the arrangement of the ferroelectric liquid crystal molecules is changed from the nematic phase (N*) to smectic C phase (Sm C*) (S5 and S6 of FIG. 10). Herein, the transition temperature Tsn is approximately 60° C.~80° C.

Figure 12:
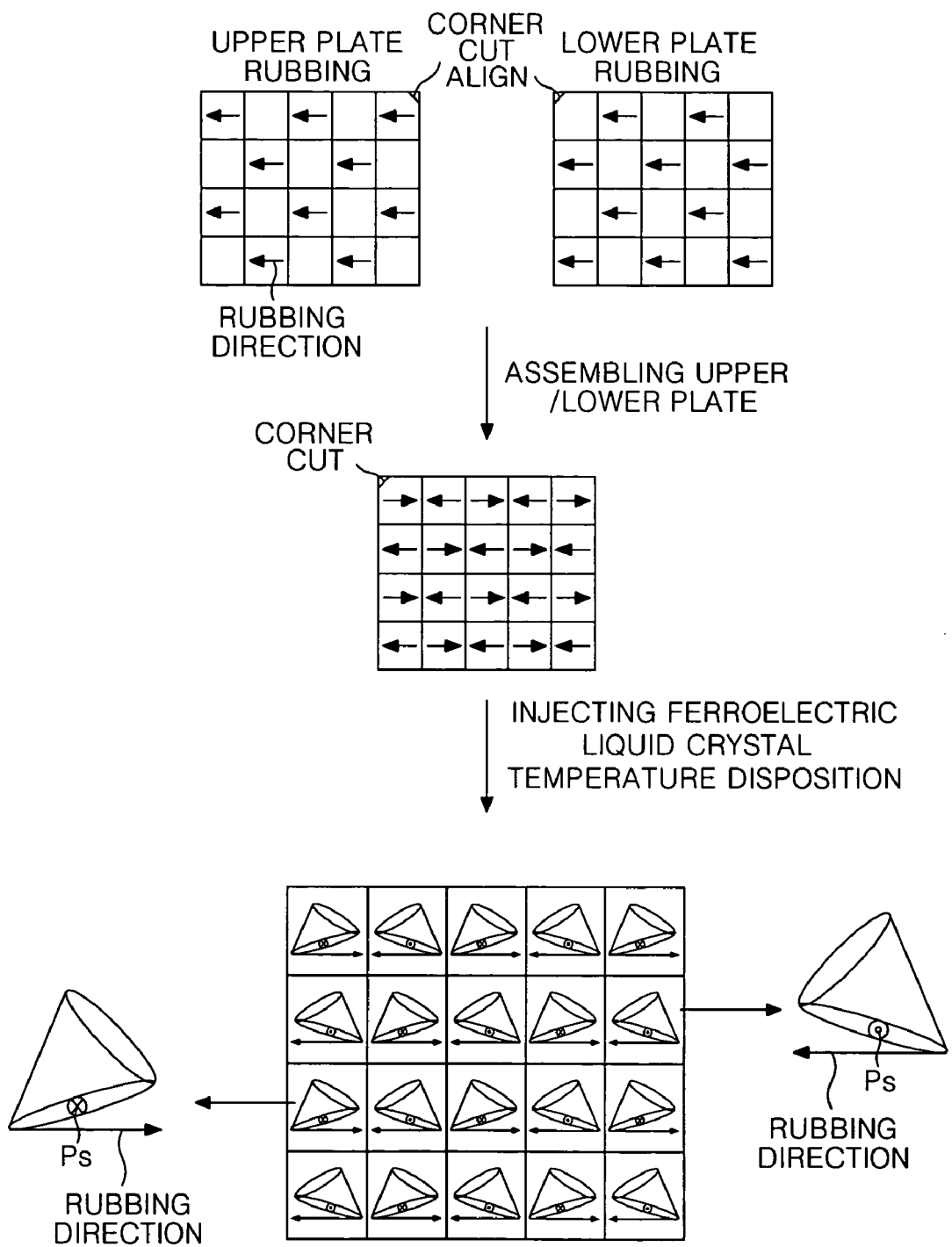
FIG. 12 illustrates alignment process of ferroelectric liquid crystal display according to an embodiment of the present invention and spontaneous polarization direction of the ferroelectric liquid crystal.
Figure 13:
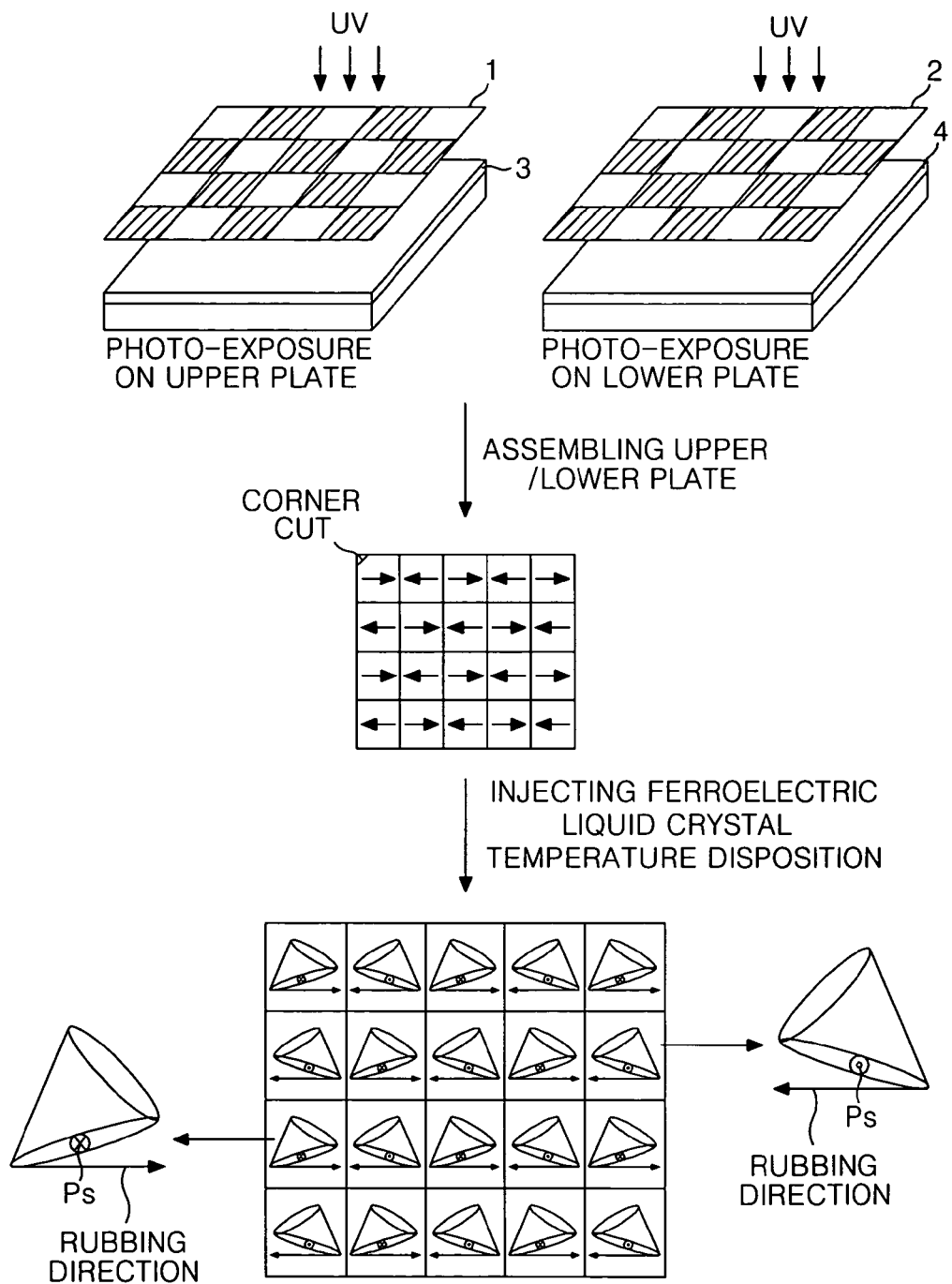
FIG. 13 illustrates alignment process of ferroelectric liquid crystal display according to another embodiment of the present invention and spontaneous polarization direction of the ferroelectric liquid crystal.

FIGS. 12 and 13 further illustrate the alignment process of using masks, as referred to in step S2 of FIG. 10. Referring to FIG. 12, the alignment process using masks according to the embodiment of the present invention includes rubbing different cells of the upper plate and the lower plate of the liquid crystal panel by using different mask patterns on the upper plate and the lower plate. More specifically on the upper plate, odd-numbered horizontal line of odd-numbered ferroelectric liquid crystal cells and even-numbered horizontal line of even-numbered ferroelectric liquid crystal cells are rubbed in a direction, and on the lower plate, odd-numbered horizontal line of even-numbered ferroelectric liquid crystal cells and even-numbered horizontal line of odd-numbered ferroelectric liquid crystal cells are rubbed in the direction identical to that of the upper plate. As shown in FIG. 12, the upper plate and the lower plate may be rubbed in a left direction. Subsequently, if the upper plate and the lower plate of the liquid crystal panel are assembled so that the alignment films of the upper plate and the lower plate faced each other, the rubbing direction of the ferroelectric liquid crystal cells is such that every second cell in each of the vertical direction and the horizontal direction is similar to the dot inversion scheme or opposite to the rubbing direction of adjacent liquid crystal cells. After such a rubbing, the ferroelectric liquid crystal material is injected into the liquid crystal panel, and the processes in steps S3 and S5 in FIG. 10 are performed so that the ferroelectric liquid crystal molecules are arranged into the smectic C phase (Sm C*). After the liquid crystal molecules are arranged in the smectic C phase (Sm C*), if a positive (or negative) polarity electric field is applied to the ferroelectric liquid crystal cells through the upper plate (a common electrode) and the lower plate (a pixel electrode) of the liquid crystal panel, in each of the ferroelectric liquid crystal cells adjacent to the vertical direction and the horizontal direction, the liquid crystal molecules react to the electric field of mutually different polarity to thereby rotate to opposite direction. That is, the liquid crystal molecules included in the odd-numbered horizontal line of the odd-numbered ferroelectric liquid crystal cell and the even-numbered horizontal line of the even-numbered ferroelectric liquid crystal cell react to the electric field of negative polarity (or positive polarity) to rotate to the spontaneous polarization direction Ps. The spontaneous polarization direction Ps becomes opposite to liquid crystal molecule of the liquid crystal cell adjacent in the vertical direction and the horizontal direction. On the contrary, the liquid crystal molecules included in the odd-numbered horizontal line of the even-numbered ferroelectric liquid crystal cell and the even-numbered horizontal line of the odd-numbered ferroelectric liquid crystal cell react to the electric field of positive polarity (or negative polarity) to rotate to the spontaneous polarization direction Ps. The spontaneous polarization direction Ps becomes opposite to liquid crystal molecule of the liquid crystal cell adjacent in the vertical direction and the horizontal direction.

The alignment disposition process by rubbing shown in FIG. 12 can be replaced with the alignment disposition process by ultraviolet ray exposure shown in FIG. 13. In this connection, the alignment films 3 and 4 of the upper plate and the lower plate are exposed to the ultraviolet ray UV through the opening regions 1a and 2a of the masks 1 and 2, and are alignment-disposed as a portion of molecule arrangement of part exposed by the ultraviolet ray is uniformly changed. Thereafter, the injection process of ferroelectric liquid crystal and the arrangement adjusting process of the ferroelectric liquid crystal by the process of lowering temperature disposition are performed. Then, the spontaneous polarization direction Ps becomes opposite to liquid crystal molecule of the liquid crystal cell adjacent in the vertical direction and the horizontal direction.

Figure 14:
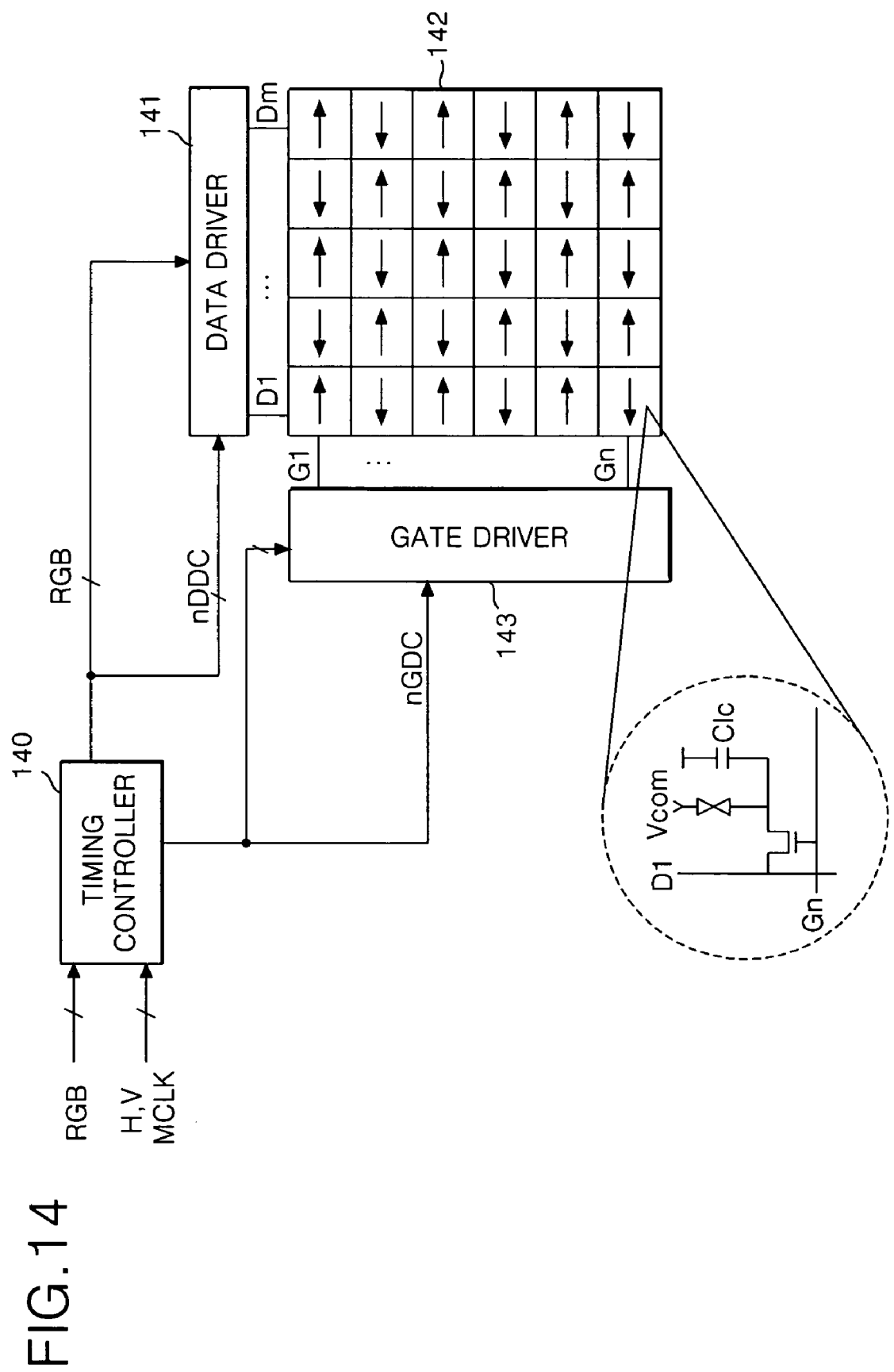
FIG. 14 is a block diagram of a ferroelectric liquid crystal display implemented according to embodiments of the present invention.

FIG. 14 illustrates a liquid crystal display according to the embodiment of the present invention. Referring to FIG. 14, the liquid crystal display according to the embodiment of the present invention comprises a liquid crystal panel 142 having the ferroelectric liquid crystal material injected therein and alignment-disposed by mask, a data driver 141 for supplying data RGB to data lines D1 to Dm of the liquid crystal panel 142, a gate driver 143 for supplying scan pulse to gate lines G1 to Gn of the liquid crystal panel 142, and a timing controller 140 for n times-speed-driving (where n is a positive integer greater than two) the data driver 141 and the gate driver 143.

Between two glass substrates of the liquid crystal panel 142, the ferroelectric liquid crystal material is injected and the liquid crystal panel is alignment-disposed so that the alignment direction becomes opposite between adjacent liquid crystal cells C1c in the vertical and the horizontal direction by using the mask as shown in FIG. 12. The data lines D1 to Dm and the gate lines G1 to Gn formed on the lower glass substrate of the liquid crystal panel 142 are crossed vertically.

The TFT formed at each of the crossings of the data lines D1 to Dm and the gate lines G1 to Gn supplies data on the data lines D1 to Dm to the liquid crystal cell C1c in response to the scan pulse from the gate lines G1 to Gn. To this end, the gate electrode of the TFT is connected to the gate lines G1 to Gn, and the source electrode is connected to the data lines D1 to Dm. The drain electrode of the TFT is connected to pixel electrode of the liquid crystal cell C1c. On the upper glass substrate of the liquid crystal panel 142, a black matrix, a color filter and a common electrode (not shown) are formed. Further, a storage capacitor is formed at each liquid crystal cell C1c of the liquid crystal panel 142. The storage capacitor is formed between the pixel electrode of the liquid crystal cell C1c and a prior stage of gate line or between the pixel electrode of the liquid crystal cell C1c and the common electrode line (not shown) to uniformly maintain voltage of the liquid crystal cell C1c.

The timing controller 140 multiplies by n frequencies of vertical/horizontal synchronization signals V/H, and a main clock MCLK, and generates n times-speed gate control signal nGDC and n times-speed data control signal nDDC whose the frequency is multiplied by n times as compared with a reference frequency 60 Hz which scans a frame of picture one time during one frame period to represent one screen by using the n times-multiplied vertical/horizontal synchronization signals V and H. The n times-speed gate control signal nGDC includes a gate start pulse, a gate shift clock, and a gate output signal. The data control signal DDC includes a source start pulse SSP, a source shift clock signal SSC, a source output signal SOE, and a polarity signal POL. The data driver 141 converts video data RGB from the timing controller 140 into analog gamma voltage VPG and VNG and controls polarity of analog gamma voltage supplied to adjacent data lines D1 to Dm with dot inversion form.

Figure 15:
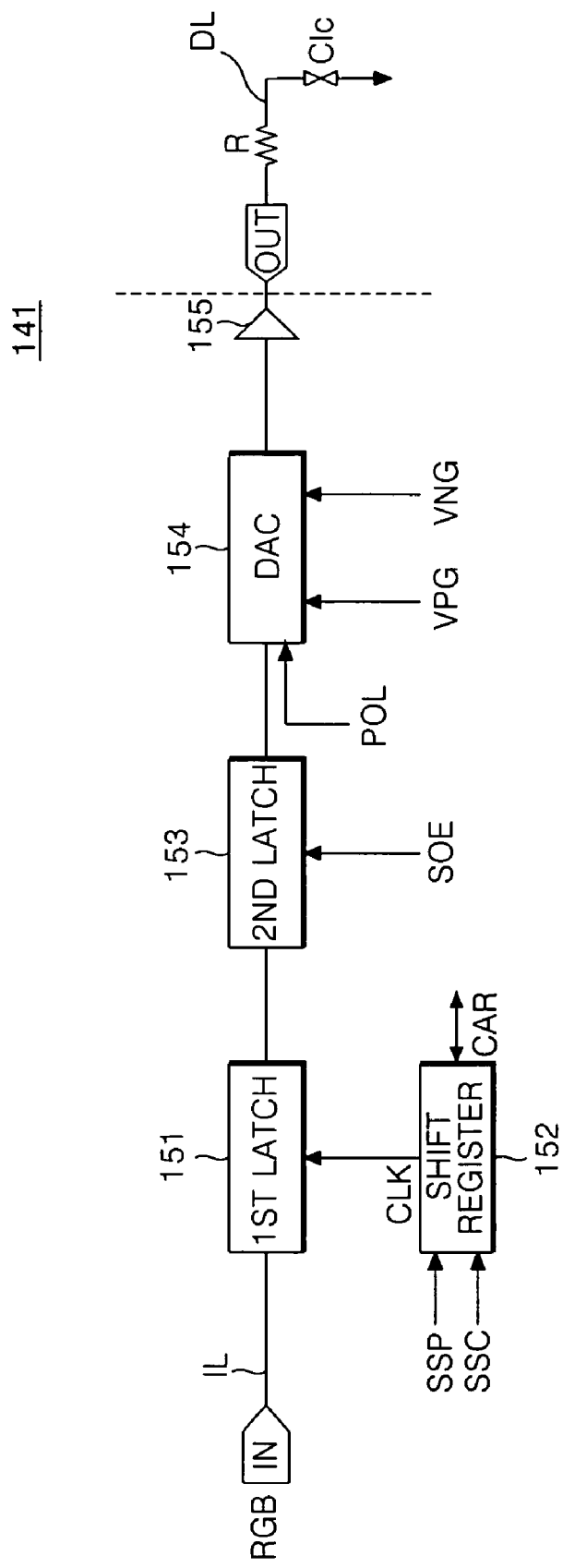
FIG. 15 is a schematic block diagram of the data driving circuit shown in FIG. 14.

As shown in FIG. 15, the data driver 141 comprises a shift register 152 subordinately connected between input line IL and the data line DL, a first latch 151, a second latch 153, a digital to analog converter 154 (hereinafter referred to as "DAC"), and a buffer 155. The shift register 152 shifts the source start pulse SSP from the timing controller 140 in accordance with source shift clock signal SSC to produce sampling signal. Further, the shift register 152 shifts the source start pulse SSP to transfer carry signal CAR to the shift register 152 of next stage. The first latch 151 samples digital video data RGB in accordance with sampling signal received from the shift register 152, and then provides stored data RGB. The second latch 153 latches the data RGB received from the first latch 151, and then simultaneously provide the data of 1 horizontal line in response to the source output signal SOE from the timing controller 140.

The DAC 154 converts the data RGB from the second latch 153 into positive polarity analog gamma voltage VPG or negative polarity analog gamma voltage VNG in response to the polarity signal POL from the timing controller 140. The buffer 155 provides analog gamma voltage VPG and VNG received from the DAC 154 to the data line DL without signal attenuation. In FIG. 15, reference numeral 'R' equivalently represents line resistance between the data driver 141 and the data line DL.

Figure 16:
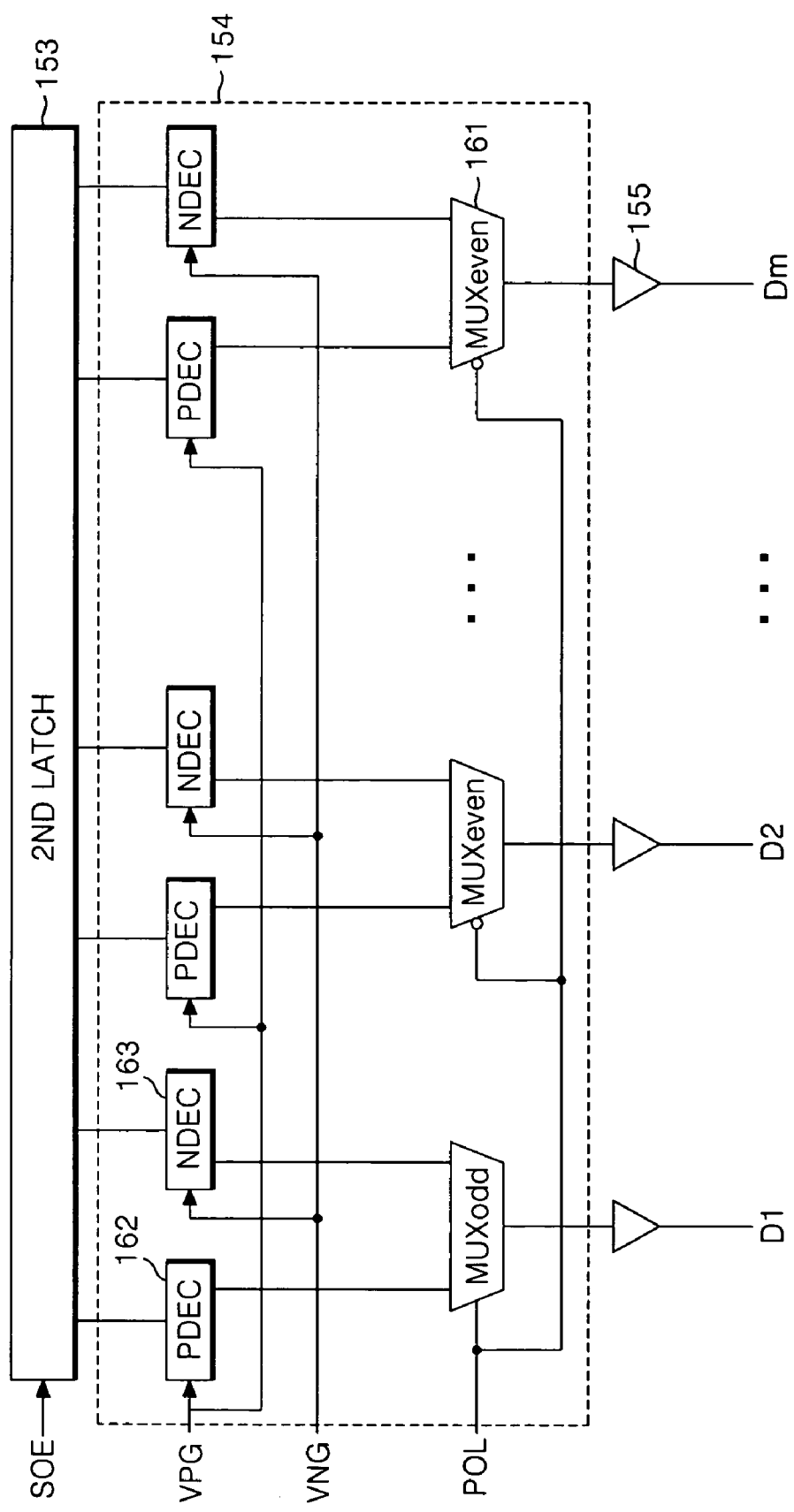
FIG. 16 is a detailed circuit diagram of the digital to analog converter shown in FIG. 15.

The DAC 154 of the data driver 141, as shown in FIG. 16, comprises a P-decoder 162 for converting the data RGB from the second latch 153 into positive analog gamma voltage VPG; a N-decoder 163 for converting the data RGB from the second latch 153 into negative polarity analog gamma voltage VNG, and a multiplexer 161 for selecting one among outputs of the P-decoder 162 and the N-decoder 163 in response to the polarity signal POL. Each multiplexer 161 selects output of the P-decoder 162 when the polarity signal POL is high logic value, and selects output of the N-decoder 163 when the polarity signal POL is low logic value. Herein, odd-numbered multiplexer 161 connected to odd-numbered data lines while D1, D3, . . . , Dm−1 selects the output of the P-decoder 162 and the output of the N-decoder 163 in response to non-converting signal of the polarity signal POL, even-numbered multiplexer 161 connected to even data lines D2, D4, . . . , Dm selects the output of the P-decoder 162 and the output of the N-decoder 163 in response to inverting signal of the polarity signal POL. Accordingly, opposite polarity of voltage is supplied to the odd-numbered data lines D1, D3, . . . , Dm−1 and the even-numbered data lines D2, D4, . . . , Dm.

Figure 17:
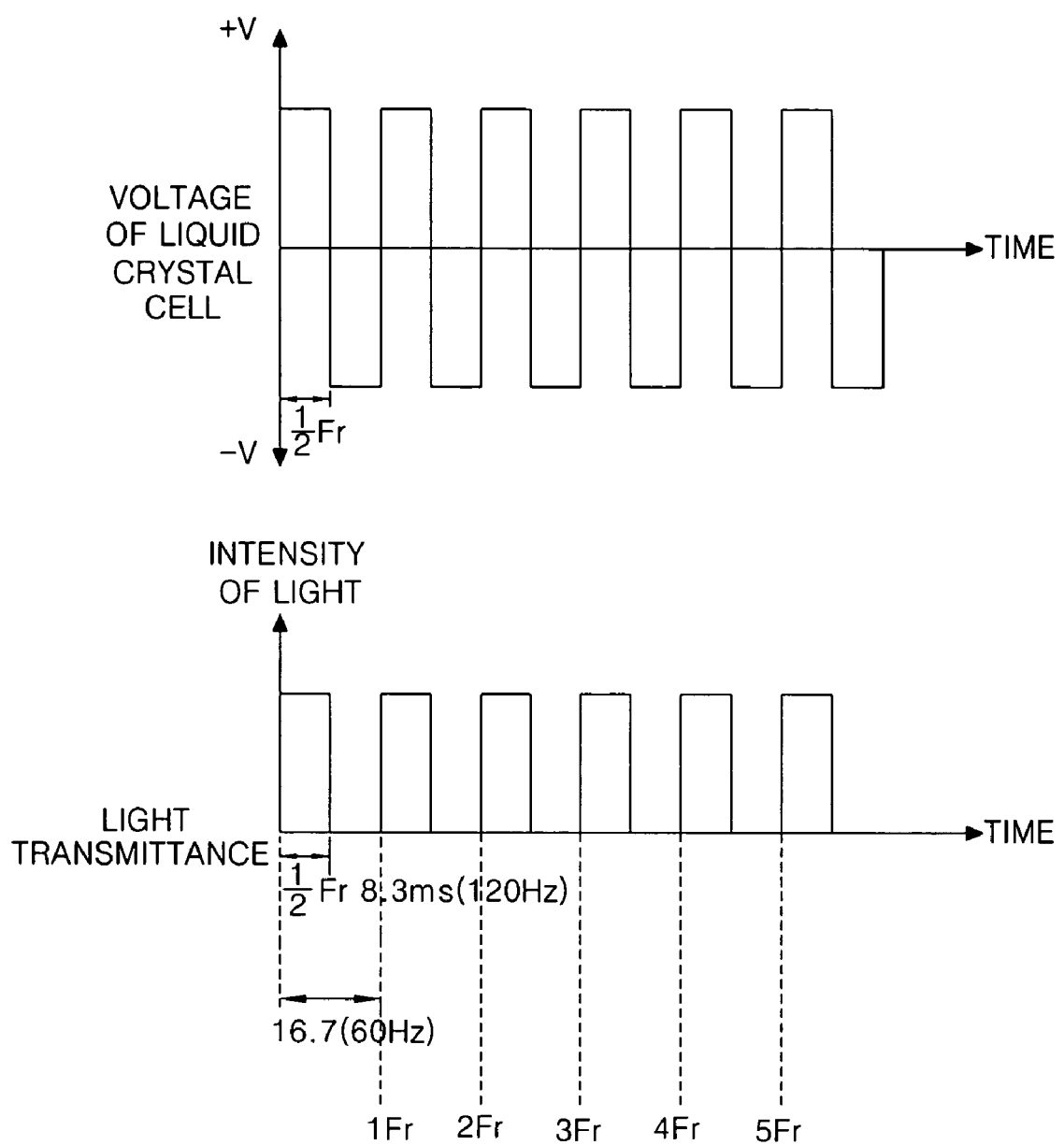
FIG. 17 illustrates voltage applied to a ferroelectric liquid crystal cell and the change of light transmissivity of the ferroelectric liquid crystal cell in instant of multiple-speed driving of ferroelectric liquid crystal display according to an embodiment of the present invention.

If the data control signal nDDC is generated as basis of two times-speed frequency 120 Hz of the reference frequency 60 Hz, the polarity of the data generated from the data driving circuit 141, as shown in FIG. 17, is inverted in a ½ frame (½ fr) period. Further, the polarity of the data generated from the data driver 141 is inverted between adjacent liquid crystal cells C1c in the vertical and the horizontal direction.

The gate driver 143 includes a shift register generating scan pulse in response to n times-speed gate control signal nGDC from the timing controller 140 and a level shifter for shifting voltage of the scan pulse to level adaptive for driving of the liquid crystal cell C1c. If the n-times-speed gate control signal nGDC is generated as basis of two times-speed frequency of the reference frequency 60 Hz, the liquid crystal panel 142 is wholly scanned two times during about 16.7 ms.

If the gate driver 143 is driven with two times-speed and generates dot inversion data with two times-speed so that the data driver 141 is synchronized with the scan pulse, as shown in FIG. 17, all of the ferroelectric liquid crystal cell C1c of the liquid crystal panel 142 make light transmitted in the ½ frame period and make the light cut-off in the rest ½ frame period. That is, the liquid crystal panel 142 is driven by sub-impulse driving wherein pictures are displayed during a portion of 1 frame period similarly to CRT and are not displayed during the rest portion of the 1 frame period The ferroelectric liquid crystal display according to the embodiment of the present invention further comprises a frame memory (not shown) so that identical data within one frame is supplied to liquid crystal panel n times in succession. The frame memory stores one frame of digital video data RGB under control of the timing controller 140, which will then be supplied to the data driver.

As a result, the aligning method of the ferroelectric liquid crystal display and the ferroelectric liquid crystal display using the same according to the embodiment of the present invention rubs adjacent ferroelectric liquid crystal cells to opposite direction each other by using mask and responds to electric field of mutually opposite polarity to control light and is sub-impulse-driven by multiple-speed driving.

As described above, the alignment method of the ferroelectric liquid crystal display according to the present invention makes alignment disposition of the ferroelectric liquid crystal cells adjacent in the horizontal and the vertical direction contrary by using mask and omits electric field alignment disposition. Further, the liquid crystal display using the alignment method supplies dot inversion data to the liquid crystal panel with n times-speed driving and wholly scans n times within one frame to display video data with sub-impulse method. As a result, the ferroelectric liquid crystal display according to the present invention can minimize color-inversion phenomenon irrespectively of viewing angle to provide wide viewing angle. When it displays moving pictures, since motion blurring or tailing phenomenon according to data maintenance can be minimized, the present invention becomes adaptive for providing moving pictures.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An aligning method of a ferroelectric liquid crystal display, comprising steps of:
    disposing a first mask and a second mask, each of which has opening regions and blocking regions arranged in alternating fashion in vertical direction and horizontal direction corresponding to liquid crystal cells of the liquid crystal display including a lower plate and an upper plate; and
    injecting a ferroelectric liquid crystal material within a liquid crystal panel;
    arranging the first mask on a first alignment film formed on the upper plate of the liquid crystal panel;
    rubbing the first alignment film of the upper plate through the first mask according to one rubbing direction;
    arranging the second mask on a second alignment film formed on the lower plate of the liquid crystal panel; and
    rubbing the second alignment film of the lower plate according to the one rubbing direction,
    wherein the opening regions of the first mask on the first alignment film corresponds to the blocking regions of the second mask on the second alignment film respectively, and the blocking regions of the first mask on the first alignment film corresponds to the opening regions of the second mask on the second alignment film respectively;
    wherein each of the opening regions is substantially the same area as a liquid crystal cell, the liquid crystal cell corresponding to an area of a pixel electrode;
    wherein the first alignment film of the upper plate and the second alignment film of the lower plate are rubbed according to the same rubbing direction;
    wherein after the upper and lower plates are assembled, the first and second alignment films have opposite rubbing directions in adjacent liquid crystal cells; and
    wherein the ferroelectric liquid crystal material in the adjacent liquid crystal cells is rotated to opposite spontaneous polarization direction.

2. The aligning method according to claim 1, the step of disposing a first mask and a second mask, further comprising the steps of:
    arranging the first mask having opening regions on a first alignment film formed on an upper plate of the liquid crystal panel;
    photo-exposing the first alignment film of the upper plate with an ultraviolet ray through the first mask;
    arranging the second mask having opening regions on a second alignment film formed on the lower plate of the liquid crystal panel; and
    photo-exposing the second alignment film of the lower plate through the second mask.

3. The aligning method according to claim 1, further comprising steps of:
    phase-transiting the ferroelectric liquid crystal material within the liquid crystal panel from an isotropic phase to a nematic phase by lowering temperature of the liquid crystal panel; and phase-transiting the ferroelectric liquid crystal within the liquid crystal panel from the nematic phase to a smectic C phase by further lowering the temperature of the liquid crystal panel.

4. An aligning method of a ferroelectric liquid crystal display, comprising steps of:

aligning an upper plate of a liquid crystal panel by using a first mask having a first plurality of opening regions patterned thereon;

rubbing a first alignment film of the upper plate through the first mask along a first direction;

aligning a lower plate of the liquid crystal panel by using a second mask having a second plurality of opening regions patterned thereon;

rubbing a second alignment film of the lower plate through the second mask along the first direction;

assembling the upper and lower plates of the liquid crystal panel, such that the first and second alignment films are aligned in opposite directions each other; and injecting a ferroelectric liquid crystal material between the assembled upper and lower plates of the liquid crystal panel, wherein the opening regions of the first mask on the first alignment film corresponds to blocking regions of the second mask on the second alignment film respectively, and the opening regions of the second mask on the second alignment film corresponds to blocking regions of the first mask on the first alignment film respectively;

wherein each of opening regions of the first and second masks is substantially the same area as a liquid crystal cell, the liquid crystal cell corresponding to an area of a pixel electrode;

wherein the first alignment film of the upper plate and the second alignment film of the lower plate are rubbed according to the same rubbing direction;

wherein after the upper and lower plates are assembled, the first and second alignment films have opposite rubbing directions in adjacent liquid crystal cells; and wherein the ferroelectric liquid crystal material in the adjacent liquid crystal cells is rotated to opposite spontaneous polarization direction.

5. The aligning method according to claim 1, wherein the liquid crystal panel has first regions corresponding to the opening regions of the first mask and second regions corresponding to the opening regions of the second mask, the first regions and the second regions are respectively aligned in opposite directions.

6. The aligning method according to claim 4, wherein the liquid crystal panel has first regions corresponding to the opening regions of the first mask and second regions corresponding to the opening regions of the second mask, the first regions and the second regions are respectively aligned in opposite directions.

7. The aligning method according to claim 5, wherein the first regions and the second regions are alternately arranged in a vertical and horizontal direction of the liquid crystal panel.

8. The aligning method according to claim 6, wherein the first regions and the second regions are alternately arranged in a vertical and horizontal direction of the liquid crystal panel.

9. The aligning method according to claim 5, wherein the first regions and the second regions are substantially the same area as the liquid crystal cell of the liquid crystal panel.

10. The aligning method according to claim 6, wherein the first regions and the second regions are substantially the same area as the liquid crystal cell of the liquid crystal panel.

* * * * *